US012809760B2

(12) United States Patent
Soh

(10) Patent No.: US 12,809,760 B2
(45) Date of Patent: Nov. 24, 2026

(54) PRE-DEPLOYMENT COMPLIANCE TESTING FOR SOURCE CODE

(71) Applicant: Capital One Services, LLC, McLean, VA (US)

(72) Inventor: Michael Soh, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 229 days.

(21) Appl. No.: 18/511,790

(22) Filed: Nov. 16, 2023

(65) Prior Publication Data

US 2025/0165382 A1 May 22, 2025

(51) Int. Cl.
*G06F 11/3698* (2025.01)
*G06F 11/3668* (2025.01)

(52) U.S. Cl.
CPC ...... *G06F 11/3698* (2025.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 10,866,792 | B1 * | 12/2020 | Tomlin | G06F 8/60 |
| 12,007,870 | B1 * | 6/2024 | Jain | G06F 11/3438 |
| 2018/0150380 | A1 * | 5/2018 | Darbha | G06F 11/3604 |
| 2022/0091966 | A1 * | 3/2022 | Wright | G06F 11/3688 |
| 2024/0201973 | A1 * | 6/2024 | Johnson | G06F 9/5005 |

FOREIGN PATENT DOCUMENTS

| | | | | |
|---|---|---|---|---|
| CN | 111857736 A | * 10/2020 | | G06F 8/61 |

* cited by examiner

*Primary Examiner* — Philip Wang
(74) *Attorney, Agent, or Firm* — Harrity & Harrity, LLP

(57) ABSTRACT

In some implementations, a system may provide a user interface of a compliance checker. The system may obtain, via the user interface, an indication of a compliance condition associated with source code. The system may perform, using the compliance checker in association with the compliance condition and prior to deployment of the source code in a production environment, a compliance test on the source code to generate a compliance test result. The system may present, via the user interface, an indication of the compliance test result.

20 Claims, 5 Drawing Sheets

PRE-DEPLOYMENT COMPLIANCE TESTING FOR SOURCE CODE

BACKGROUND

In software engineering, a software application development process (e.g., also known as a software development life cycle) is a process of dividing software development work into distinct phases to improve design, product management, project management, and/or the like. The software application development process may include an application development phase, an application build phase, an application testing phase, an application artifact phase, an application deployment phase, an application release phase, an application monitoring phase, an application support phase, and/or the like.

SUMMARY

Some implementations described herein relate to a system for compliance testing of source code prior to deployment. The system may include one or more memories and one or more processors communicatively coupled to the one or more memories. The one or more processors may be configured to obtain, via a user interface of a compliance checker, an indication of a compliance condition associated with source code. The one or more processors may be configured to generate, using the compliance checker in association with the indication of the compliance condition, a compliance file indicative of the compliance condition. The one or more processors may be configured to perform, using the compliance checker in association with the compliance file, a compliance test on the source code to generate a compliance test result. The one or more processors may be configured to output an indication of the compliance test result. The one or more processors may be configured to perform an action prior to deployment of the source code in a production environment and in association with the indication of the compliance test result.

Some implementations described herein relate to a method of compliance testing of source code prior to deployment. The method may include providing a user interface of a compliance checker. The method may include obtaining, via the user interface, an indication of a compliance condition associated with source code. The method may include performing, using the compliance checker in association with the compliance condition and prior to deployment of the source code in a production environment, a compliance test on the source code to generate a compliance test result. The method may include presenting, via the user interface, an indication of the compliance test result.

Some implementations described herein relate to a non-transitory computer-readable medium that stores a set of instructions. The set of instructions, when executed by one or more processors of a device, may cause the device to obtain, via a user interface of a compliance checker, an indication of a compliance condition associated with source code. The set of instructions, when executed by one or more processors of the device, may cause the device to generate, using the compliance checker in association with the indication of the compliance condition, a compliance file indicative of the compliance condition. The set of instructions, when executed by one or more processors of the device, may cause the device to perform, using the compliance checker in association with the compliance file, a compliance test on the source code to generate a compliance test result. The set of instructions, when executed by one or more processors of the device, may cause the device to output an indication of the compliance test result.

DETAILED DESCRIPTION

Figure 1A:
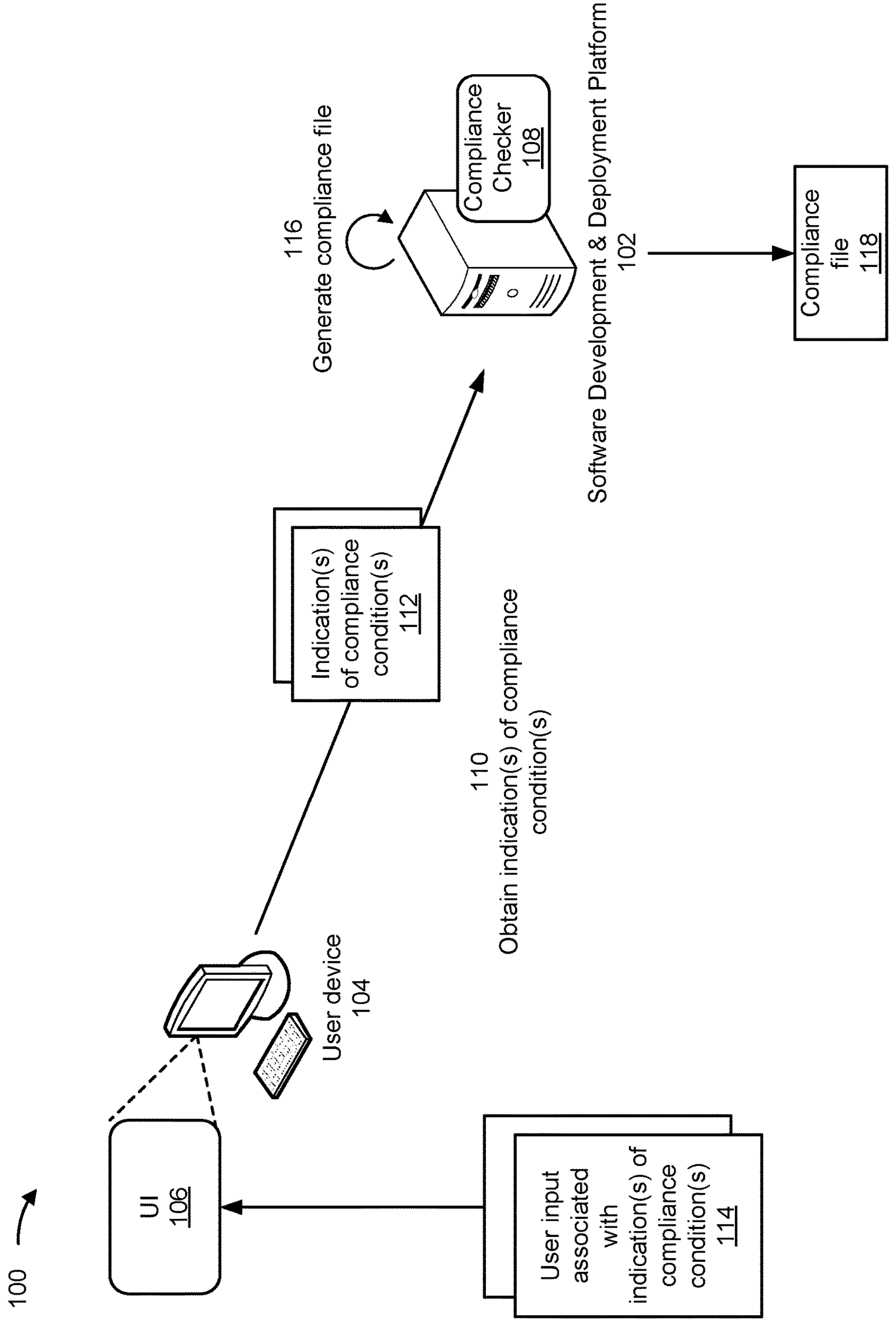
FIGS. 1A-1B are diagrams of an example implementation related to transforming data into data entities, in accordance with some embodiments of the present disclosure.

The following detailed description of example implementations refers to the accompanying drawings. The same reference numbers in different drawings may identify the same or similar elements.

Software application development relies on multiple techniques to generate reliable and stable applications. While software is developed, tested, updated, and put into production, the software may go through multiple iterations, or versions, and be developed in various environments, using various frameworks and/or various hardware configurations, and by various teams and/or team members. In some cases, a software package may be developed for use by, or in connection with, any number of different teams, scenarios, deployments, and/or use cases, among other examples. Different teams, scenarios, deployments, and/or use cases may require different components to be included in the software package.

For example, in order for a software package to be effectively deployed in one deployment scenario (e.g., one region), the source code may need to have a first parameter or parameters set to a first set of values and, for the software package to be effectively deployed in an additional deployment scenario (e.g., an additional region), the source code may need to have a second parameter or parameters set to a second set of values. In some cases, the software package may be tested with test data within a testing phase to determine whether the software includes the different parameter values necessary for the different deployments. This process can be cumbersome and may include first compiling the source code, generating test data configured to test the deployments in a way that reveals the presence or lack of the parameter value sets, and/or the like.

Some implementations described herein enable performing compliance checks on source code during the development phase of a software package. For example, in some implementations, a software development and deployment platform may be a system that includes a compliance checker. A compliance checker is a computing entity (e.g., a software component, a hardware component, and/or a firmware component) that enables customizable compliance checks associated with source code in a software development pipeline. For example, in some implementations, the compliance checker may be a software entity within a software development kit (SDK), a software module associated with a web service, and/or an application programming interface (API), among other examples.

The compliance checker may perform a compliance check by determining whether the source code satisfies one or more compliance conditions. A compliance condition may be a rule about something that the source code is to contain or is not to contain. For example, in some implementations, a source code may satisfy a compliance condition in association with (e.g., based on or as a result of) the source code including one or more parameters, one or more specified values of one or more parameters, one or more specified function calls, one or more variables, one or more values of one or more parameters, one or more functions, and/or one or more specified source code components, among other examples.

In some implementations, for example, a compliance checker may obtain, via a user interface, an indication of a compliance condition associated with source code. The compliance checker may generate, in association with the indication of the compliance condition, a compliance file indicative of the compliance condition. In some implementations, the compliance file may be a file generated in a format corresponding to a human-readable data-serialization language such as, for example, a JavaScript Object Notation (JSON) file format and/or a YAML file format, among other examples. In this way, some implementations may facilitate receiving compliance condition information from a variety of different types of users without the necessity of new source code being written to facilitate each compliance check. In some implementations, generating the compliance file may include providing information received via a user interface to an existing file. For example, a compliance file may be generated and used by the compliance checker for indicating one or more compliance conditions received via one or more user interfaces. In some implementations, for example, the compliance checker may cause a user interface to be presented, via a display device of a user device. The user interface may include one or more fields (e.g., text fields, selection menus, drop-down menus, and/or buttons, among other examples) configured to obtain user inputs from a user of the user device. The compliance checker may map the user inputs to corresponding fields in the compliance file. In this way, some implementations may facilitate improvement of a user experience in the development process by enabling a range of users that are not software developers (e.g., programmers) to provide inputs to the compliance checker. In some implementations, the compliance file may be used to indicate compliance conditions provided by any number of different users. Some implementations also may reduce redundancy in compliance checking by first collecting a set of compliance conditions and checking the source code for compliance with some or all of the compliance conditions based on the single compliance file.

The compliance checker may perform, in association with the compliance file, a compliance test on the source code to generate a compliance test result. For example, the compliance checker may access the source code (e.g., by retrieving a copy of the source code, calling the source code, reading the source code, and/or otherwise accessing the source code) and may determine whether the source code satisfies the one or more compliance conditions indicated in the compliance file. In some implementations, compliance may be checked to determine whether the source code passes or fails. In some implementations, the source code may be determined to pass based on a determination that the source code satisfies at least one compliance condition of a number of compliance conditions indicated in the compliance file. In some other implementations, the source code may be determined to pass based on a determination that the source code satisfies all of the compliance conditions indicated in the compliance file.

The compliance checker may output an indication of the compliance test result and perform an action, prior to deployment of the source code in a production environment and in association with the indication of the compliance test result. In some aspects, the compliance checker may output the indication of the compliance test result to one or more components of a software development and deployment platform in which the source code has been developed. In some aspects, the indication of the compliance test result may include a pass indication or a fail indication. In some implementations, to perform the action, the compliance checker may be configured to cause a display device to display the indication of the compliance test result. For example, in some implementations, the indication of the compliance test result may include an indication of whether the source code passed or failed the compliance check. In some implementations, when more than one compliance condition is included in the compliance file, the compliance test result may include, for each compliance condition, an indication of whether the source code satisfied the compliance condition. In some implementations, the compliance test result may include indications associated only with compliance conditions that the source code failed to satisfy.

In some implementations, the compliance test result may indicate a location in the source code associated with a compliance condition (and, in some cases, only associated with a failed compliance condition). The indication of the location in the source code may, in some examples, include a link to the location in the source code. In this way, the compliance checker may facilitate providing an efficient manner of rectifying a failed compliance condition. In some cases, the compliance test result may include a user input mechanism by which a user may provide an input that causes the compliance checker to modify the source code to bring the source code into compliance with one or more compliance conditions. For example, if the compliance condition indicates a specified value of a specified parameter required in the source code, and the compliance checker determines that the specified parameter has a different value, the compliance test result may include an interactive user interface element that enables a user to provide an input that causes the compliance checker to change the value of the specified parameter to the specified value. In this way, some implementations may facilitate an efficient manner of fixing source code (without involving a programmer) to ensure the compliance of the source code during the development process. In some implementations, to perform the action, the compliance checker may be configured to modify the source code in association with the compliance condition. For example, if the compliance checker determines that a specified parameter in the source code is not set to a specified value, the compliance checker may automatically (e.g., without being triggered to do so by a user input) set the parameter to the specified value.

Some implementations described herein may facilitate a customizable compliance check operation with respect to source code prior to a testing phase associated with that source code. The compliance checker may obtain human-readable user input specifying compliance conditions to be checked and may perform the compliance check. In this way, for example, any number of different types of users and/or teams may provide relevant input to the software development process without having to write code. As a result, some implementations may facilitate a development process that enables identifying a variety of compliance issues associated with source code during a development process, thereby potentially reducing computational burdens in a testing environment as well as facilitating checks of, and changes to, the source code that may be performed through the compliance checker instead of through additional source code. In this way, some implementations may reduce data storage and compiling burdens during development and compiling phases of a software development.

Figure 1B:
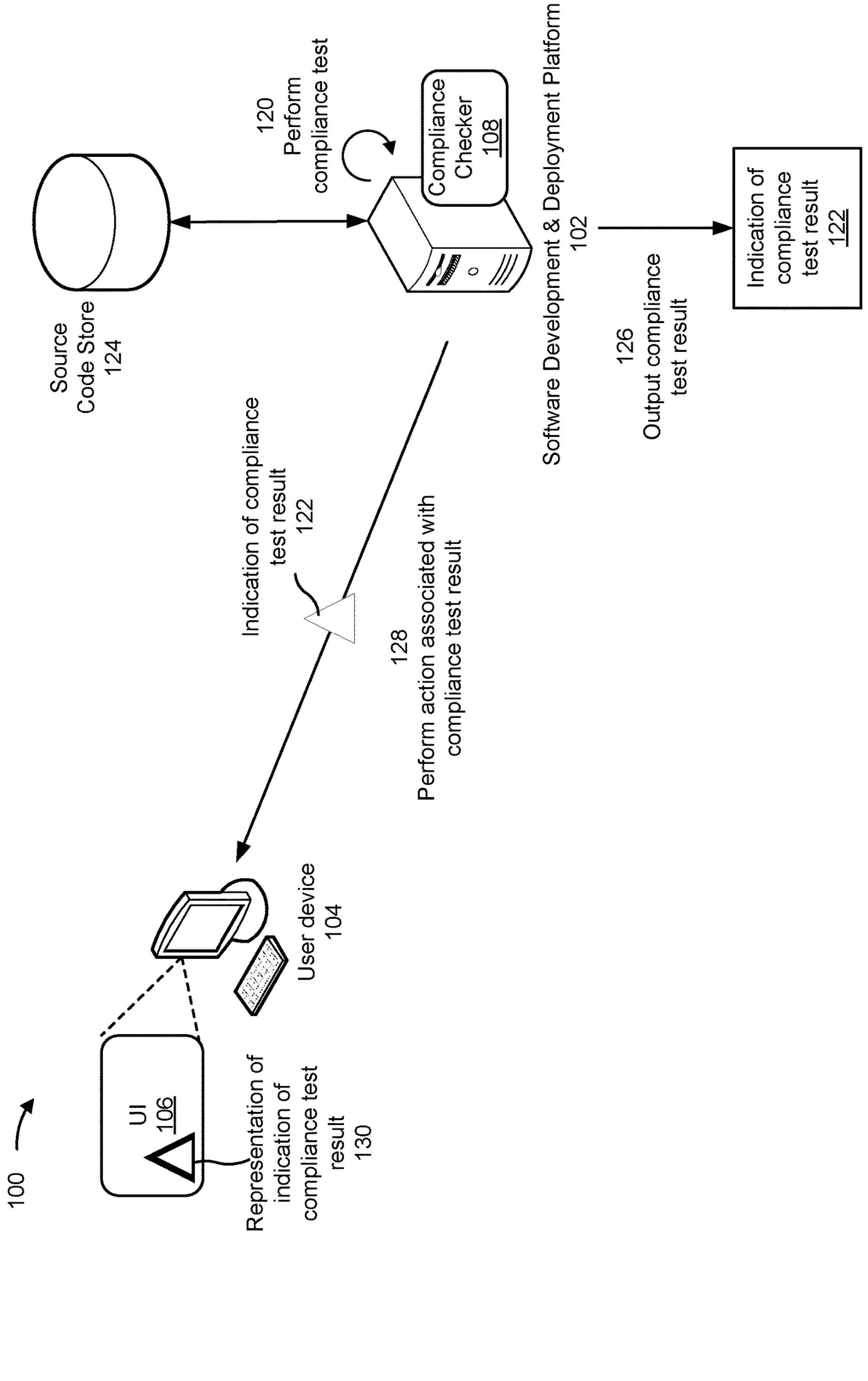

FIGS. 1A-1B are diagrams of an example implementation 100 related to pre-deployment compliance checking for source code. As shown in FIGS. 1A-1B, example implementation 100 includes a software development and deployment platform 102 (referred to herein interchangeably as a "system" instead of a "platform") and a user device 104 configured to present a user interface (UI) 106. As shown, the software development and deployment platform 102 may include a compliance checker 108. In some implementations, the software development and deployment platform 102 may include more than one compliance checker 108. In some implementations, the compliance checker 108 may be instantiated via a web service associated with the software development and deployment platform 102. In some implementations, the compliance checker 108 may be instantiated by a web service independent of the software development and deployment platform 102. In some implementations, the compliance checker 108 may be instantiated via a software as a service (SaaS) model, via a transitory computer-readable medium, and/or via a client instantiated at the user device 104, among other examples.

As shown by reference number 110, the software development and deployment platform 102 (which may be referred to as a "system" herein) may obtain, via the compliance checker 108, one or more indications 112 of one or more compliance conditions associated with a source code. For example, as shown, the compliance checker 108 may cause the user device 104 to present, via a display device, the UI 106, which may be used to obtain user input 114 associated with the one or more indications 112 of the one or more compliance conditions. The UI 106 of the compliance checker 108 may include an interactive interface configured to receive non-code user inputs. The UI 106 may be any type of graphical UI (GUI) configured to present information and receive user input (e.g., via interactive text fields, user-selectable buttons, and/or drop-down menus, among other examples). In some implementations, for example, the UI 106 may present a set of representations of selectable compliance conditions, and a user may provide user input 114 indicating one or more of the compliance conditions to be checked. In some implementations, the UI 106 may present an interactive UI element that enables the user to input one or more values associated with one or more parameters.

In some implementations, any number of different user devices 104 may be used to provide any number of different user inputs 114 indicating compliance conditions. In some examples, the UI 106 presented via the user device 104 may be customizable and/or configured in association with an intended audience. For example, in some implementations, a first UI may be presented, via a first user device 104 to a first user (e.g., a first type of user, a user with a first role, and/or a user having a first access permission, among other examples), a first set of interactive UI elements for obtaining a first set of user inputs 114 associated with a first set of compliance conditions. Similarly, a second UI may be presented, via a second user device 104 to a second user (e.g., a second type of user, a user with a second role, and/or a user having a second access permission, among other examples), a second set of interactive UI elements for obtaining a second set of user inputs 114 associated with a second set of compliance conditions.

In some implementations, the compliance checker 108 may be configured to enforce security rules associated with providing input. For example, only certain users and/or types of users may be allowed to provide inputs that result in compliance checks with certain aspects of the source code. The compliance checker 108 may be provided with security rules, permissions, and/or security mechanisms (e.g., encryption software and/or authentication functions, among other examples) to facilitate enforcing the security rules with respect to providing input to the compliance checker 108.

As shown by reference number 116, the software development and deployment platform 102 may generate, using the compliance checker 108 in association with the one or more indications of the one or more compliance conditions, a compliance file 118 indicative of the one or more compliance conditions. In some implementations, the compliance file 118 may be a YAML file and may indicate any number of compliance conditions. An indication of a compliance condition may include an indication of a code component that the source code is to contain and/or a code component that the source code is to omit. In some implementations, the component may include a parameter (e.g., a deployment parameter associated with an aspect of a deployment of the source code), a parameter value, a function, a function call, and/or a set of code, among other examples.

As shown in FIG. 1B by reference number 120, the software development and deployment platform 102 may perform, using the compliance checker 108 in association with the compliance file 118, a compliance test on the source code to generate an indication 122 of a compliance test result. For example, the compliance checker 108 may access a source code store 124 that maintains the source code and may determine whether one or more compliance conditions indicated by the compliance file 118 are satisfied by the source code, as described herein. Based on the compliance check, the compliance checker may, as shown by reference number 126, output an indication 122 of the compliance test result. In some implementations, the indication of the compliance test result may include a pass indication or a fail indication. In some implementations, as shown by reference number 128, the compliance checker 108 may perform an action in association with the indication 122 of the compliance test result. For example, in some implementations, the compliance checker may cause a representation 130 of the indication of the compliance test result to be presented on a UI 106. In some implementations, the representation 130 of the indication 122 of the compliance test result may include one or more representations of aspects of the source code. For example, in some implementations, the compliance checker 108 may be configured to expose one or more code components (e.g., code components that are being checked for compliance) and/or one or more attributes thereof.

In some implementations, the compliance checker 108 may be configured to modify the source code in association with the compliance condition. For example, in some aspects, the compliance checker 108 may include a source code generation engine that may generate corrected source code and include it within the source code. In some implementations, the compliance checker 108 may modify the source code by interfacing with a source code generation and/or modification component that modifies the source code. In some implementations, subsequent to modifying the source code, the compliance checker 108 may cause a user device to present an indication associated with the modification. For example, the compliance checker 108 may cause the user device 104 to present an indication of an updated compliance test result (e.g., after performing an updated compliance test associated at least with the modified source code). In some implementations, the compliance checker 108 may cause the user device 104 to present an indication of the modified source code (e.g., a representation of the code component that has been modified).

By providing a compliance checker 108 configured to check source code for compliance prior to deployment (e.g., prior to compiling, testing, and/or deploying the source code), some implementations may facilitate an efficient manner of fixing source code (without involving a programmer) to ensure the compliance of the source code during the development process. In some implementations, to perform the action, the compliance checker 108 may be configured to modify the source code in association with the compliance condition. By configuring the compliance checker to obtain human-readable user input specifying compliance conditions to be checked, different types of users and/or teams may provide relevant input to the software development process without having to write code. As a result, some implementations may facilitate a development process that enables identifying a variety of compliance issues associated with source code during a development process, thereby potentially reducing computational burdens in a testing and/or deployment environment.

Figure 2:
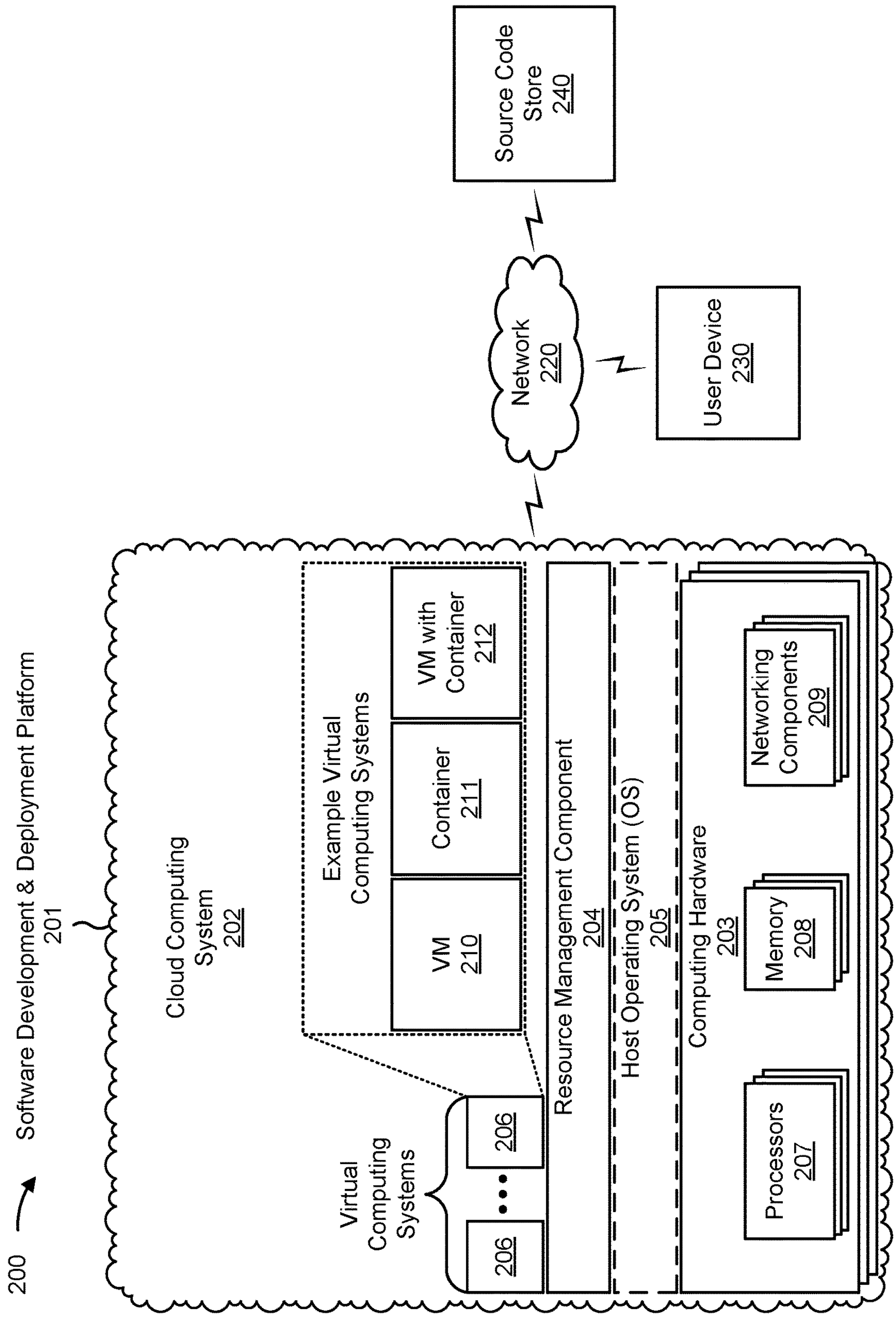
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a software development and deployment platform 201, which may include one or more elements of and/or may execute within a cloud computing system 202. The cloud computing system 202 may include one or more elements 203-212, as described in more detail below. As further shown in FIG. 2, environment 200 may include a network 220, a user device 230, and/or a source code store 240. In some aspects, the user device 230 and/or the source code store 240 may be included within the cloud computing system 202. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A container 211 may include an environment associated with executing an application in the cloud computing system 202. For example, a container 211 may include application code, runtime, system tools, libraries, and/or settings, among other examples, associated with executing an application. In some implementations, each container 211 may be associated with a dedicated file system, network interfaces, and/or process namespace, among other examples. Containers 211 and virtual machines 210 may provide isolation and abstraction for applications. In some implementations, a container 211 may be referred to as a Docker container, such as when a container 211 utilizes Docker as a containerization platform. A virtual machine 210 may be associated with a full copy of a host operating system (e.g., the host operating system 205) to enable the virtual machine 210 to operate. A container 211 may share a host operating system kernel with the cloud computing system 202 and may only include the software libraries and dependencies needed to run an application (e.g., enabling the container 211 to be smaller in size than a virtual machine 210 and to stop and/or start operations faster than a virtual machine 210).

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the software development and deployment platform 201 may include one or more elements 203-212 of the cloud computing system 202, may execute within the cloud computing system 202, and/or may be hosted within the cloud computing system 202, in some implementations, the software development and deployment platform 201 may not be cloud-based (e.g., may be implemented outside of a cloud computing system) or may be partially cloud-based.

Figure 3:
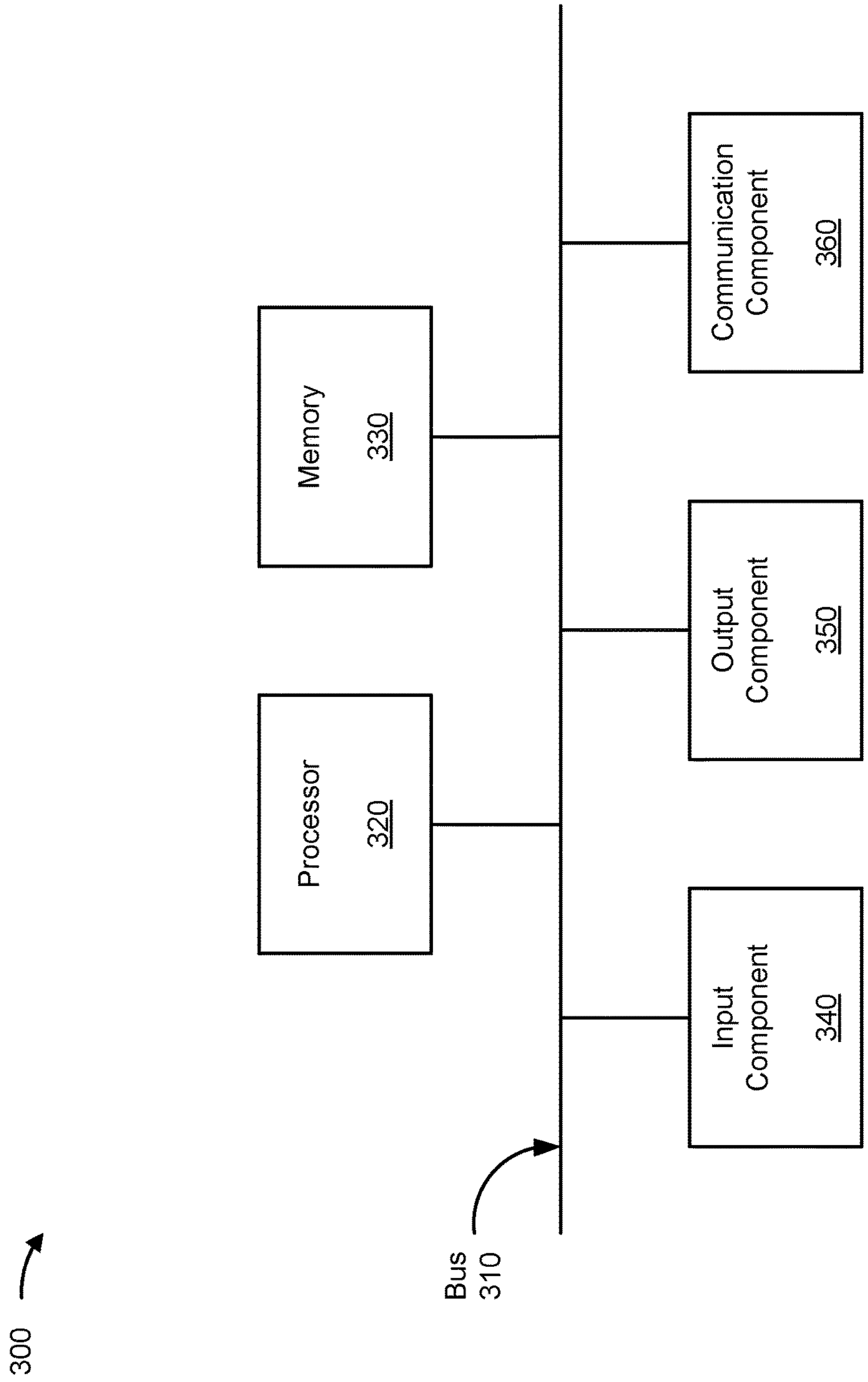
FIG. 3 is a diagram of example components of a device associated with compliance testing of source code prior to deployment, in accordance with some embodiments of the present disclosure.

For example, the software development and deployment platform 201 may include one or more devices that are not part of the cloud computing system 202, such as device 300 of FIG. 3, which may include a standalone server or another type of computing device. The software development and deployment platform 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 may include one or more devices capable of receiving, generating, storing, processing, providing, and/or routing information associated with software development and/or deployment within cloud computing environments, such as the software development and deployment platform 201, as described elsewhere herein. The user device 230 may include a communication device and/or a computing device. For example, the user device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The source code store 240 may include a communication device and/or a computing device. For example, the source code store 240 may include a server, such as an application server, a client server, a web server, a database server, a host server, a proxy server, a virtual server (e.g., executing on computing hardware), or a server in a cloud computing system. In some implementations, the source code store 240 may include computing hardware used in a cloud computing environment, such as the software development and deployment platform 201.

The source code store 240 may include one or more devices capable of receiving, generating, storing, processing, and/or providing source code for software development and/or deployment in cloud computing environments, as described elsewhere herein. The source code store 240 may include a data structure, a cache, a database, a data source, a server, a database server, an application server, a client server, a web server, a host server, a proxy server, a virtual server (e.g., executing on computing hardware), a server in a cloud computing system, a device that includes computing hardware used in the cloud computing environment 200, or a similar type of device. As an example, the source code store 240 may store source code to be checked for compliance via the software development and deployment platform 201, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

FIG. 3 is a diagram of example components of a device 300 associated with compliance testing of source code prior to deployment. The device 300 may correspond to the cloud computing system 202 (and/or one or more devices or components of the cloud computing system 202), the user device 230, and/or the source code store 240. In some implementations, the cloud computing system 202 (and/or one or more devices or components of the cloud computing system 202), the user device 230, and/or the source code store 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
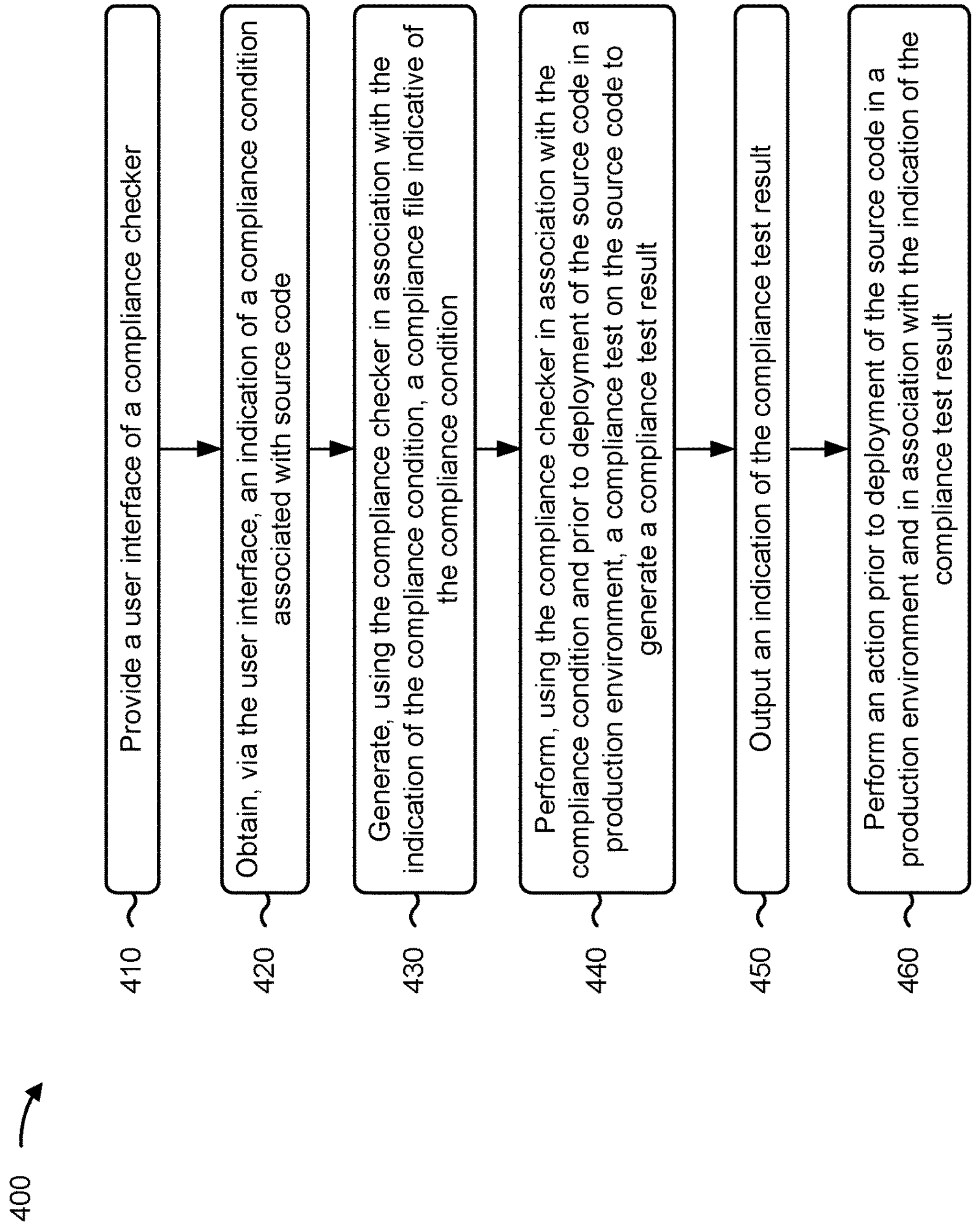
FIG. 4 is a flowchart of an example process associated with pre-deployment compliance testing for source code, in accordance with some embodiments of the present disclosure.

FIG. 4 is a flowchart of an example process 400 associated with pre-deployment compliance testing for source code. In some implementations, one or more process blocks of FIG. 4 may be performed by the user device 230. In some implementations, one or more process blocks of FIG. 4 may be performed by another device or a group of devices separate from or including the user device 230, such as the software development and deployment platform 201, the cloud computing system 202 and/or the source code store 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include providing a UI of a compliance checker (block 410). For example, the software development and deployment platform 201 and/or the user device 230 (e.g., using processor 320, memory 330, input component 340, output component 350, and/or communication component 360) may provide a UI of a compliance checker. As further shown in FIG. 4, process 400 may include obtaining, via a user interface of a compliance checker, an indication of a compliance condition associated with source code (block 420). For example, the software development and deployment platform 201 and/or the user device 230 (e.g., using processor 320, memory 330, input component 340, output component 350, and/or communication component 360) may obtain, via a user interface of a compliance checker, an indication of a compliance condition associated with source code, as described above in connection with reference number 110 of FIG. 1A. In some implementations, the user interface of the compliance checker may be an interactive interface configured to receive non-code user inputs. In some implementations, the compliance condition may be associated with a specified deployment parameter. In some implementations, the compliance checker may include an API.

As further shown in FIG. 4, process 400 may include generating, using the compliance checker in association with the indication of the compliance condition, a compliance file indicative of the compliance condition (block 430). For example, the software development and deployment platform 201 and/or the user device 230 (e.g., using processor 320 and/or memory 330) may generate, using the compliance checker in association with the indication of the compliance condition, a compliance file indicative of the compliance condition, as described above in connection with reference number 116 of FIG. 1A. In some implementations, the compliance condition may be associated with a specified deployment parameter and the compliance file may be further indicative of at least one additional compliance condition associated with at least one additional specified deployment parameter.

As further shown in FIG. 4, process 400 may include performing, using the compliance checker in association with the compliance file, a compliance test on the source code to generate a compliance test result (block 440). For example, the software development and deployment platform 201 and/or the user device 230 (e.g., using processor 320 and/or memory 330) may perform, using the compliance checker in association with the compliance file, a compliance test on the source code to generate a compliance test result, as described above in connection with reference number 120 of FIG. 1B. In some implementations, the compliance condition may be associated with a plurality of code components, and performing the compliance test may include determining whether the source code includes at least one code component of the plurality of code components. In some implementations, determining whether the source code includes the at least one code component may include determining whether the source code includes each code component of the plurality of code components.

As further shown in FIG. 4, process 400 may include outputting an indication of the compliance test result (block 450). For example, the software development and deployment platform 201 and/or the user device 230 (e.g., using processor 320, memory 330, output component 350, and/or communication component 360) may output an indication of the compliance test result, as described above in connection with reference number 126 of FIG. 1B. In some implementations, the indication of the compliance test result includes a pass indication or a fail indication.

As further shown in FIG. 4, process 400 may include performing an action prior to deployment of the source code in a production environment and in association with the indication of the compliance test result (block 460). For example, the software development and deployment platform 201 and/or the user device 230 (e.g., using processor 320, memory 330, input component 340, output component 350, and/or communication component 360) may perform an action prior to deployment of the source code in a production environment and in association with the indication of the compliance test result, as described above in connection with reference number 128 of FIG. 1B. In some implementations, performing the action may include causing a display device to display a representation of the indication of the compliance test result. In some implementations, performing the action may include modifying the source code in association with the compliance condition.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for compliance testing of source code prior to deployment, the system comprising:

one or more memories; and one or more processors, communicatively coupled to the one or more memories, configured to:

obtain, via a user interface of a compliance checker, one or more user inputs indicating a compliance condition associated with source code, wherein the user interface is customized based on an access permission associated with an intended audience of the user interface;

generate, using the compliance checker in association with the indication of the compliance condition, a compliance file indicative of the compliance condition based on mapping the one or more user inputs obtained via the user interface to corresponding fields in the compliance file;

perform, using the compliance checker in association with the compliance file, a compliance test on the source code to generate a compliance test result;

output an indication of the compliance test result, wherein the indication of the compliance test result includes a respective interactive user interface element for each respective compliance condition that is not satisfied, and wherein each respective interactive user interface element is configured to cause, in response to receiving an input at the respective interactive user interface element, the compliance checker to perform an action that corresponds to the respective interactive user interface element; and perform, in response to receiving a user input at at least one of the respective interactive user interface elements, prior to deployment of the source code in a production environment, and in association with the indication of the compliance test result, an action that corresponds to the at least one of the respective interactive user interface elements.

2. The system of claim 1, wherein the indication of the compliance test result comprises a pass indication or a fail indication.

3. The system of claim 1, wherein the user interface of the compliance checker comprises an interactive interface configured to receive non-code user inputs.

4. The system of claim 1, wherein the compliance condition is associated with a specified deployment parameter.

5. The system of claim 4, wherein the compliance file is further indicative of at least one additional compliance condition associated with at least one additional specified deployment parameter.

6. The system of claim 1, wherein the compliance condition is associated with a plurality of code components, and wherein the one or more processors, to perform the compliance test, are configured to determine whether the source code includes at least one code component of the plurality of code components.

7. The system of claim 6, wherein the one or more processors, to determine whether the source code includes the at least one code component, are configured to determine whether the source code includes each code component of the plurality of code components.

8. The system of claim 1, wherein the one or more processors, to perform the action, are configured to cause a display device to display a representation of the indication of the compliance test result.

9. The system of claim 1, wherein the one or more processors, to perform the action, are configured to modify the source code in association with the compliance condition.

10. The system of claim 9, wherein the compliance checker comprises an application programming interface.

11. The system of claim 1, wherein the indication of the compliance test result includes an indication of a location in the source code associated with a failed compliance condition.

12. A method of compliance testing of source code prior to deployment, comprising:

providing a user interface of a compliance checker, wherein the user interface is customized based on an access permission associated with an intended audience of the user interface;

obtaining, via the user interface, one or more user inputs indicating a compliance condition associated with source code;

performing, using the compliance checker in association with the compliance condition and prior to deployment of the source code in a production environment, a compliance test on the source code to generate a compliance test result; and presenting, via the user interface, an indication of the compliance test result, wherein the indication of the compliance test result includes a respective interactive user interface element for each respective compliance condition that is not satisfied, and wherein each respective interactive user interface element is configured to cause, in response to receiving an input at the respective interactive user interface element, the compliance checker to perform an action that corresponds to the respective interactive user interface element.

13. The method of claim 12, further comprising generating, using the compliance checker in association with the indication of the compliance condition, a compliance file indicative of the compliance condition.

14. The method of claim 12, wherein the indication of the compliance test result comprises a pass indication or a fail indication.

15. The method of claim 12, wherein the compliance condition is associated with a specified deployment parameter.

16. The method of claim 12, wherein the compliance condition is associated with a plurality of code components, and wherein performing the compliance test comprises determining whether the source code includes at least one code component of the plurality of code components.

17. The method of claim 16, wherein determining whether the source code includes the at least one code component comprises determining whether the source code includes each code component of the plurality of code components.

18. A non-transitory computer-readable medium storing a set of instructions, the set of instructions comprising:

one or more instructions that, when executed by one or more processors of a device, cause the device to:

obtain, via a user interface of a compliance checker, one or more user inputs indicating a compliance condition associated with source code, wherein the user interface is customized based on an access permission associated with an intended audience of the user interface;

generate, using the compliance checker in association with the indication of the compliance condition, a compliance file indicative of the compliance condition based on mapping the one or more user inputs obtained via the user interface to corresponding fields in the compliance file;

perform, using the compliance checker in association with the compliance file, a compliance test on the source code to generate a compliance test result; and output an indication of the compliance test result, wherein the indication of the compliance test result includes a respective interactive user interface element for each respective compliance condition that is not satisfied, and wherein each respective interactive user interface element is configured to cause, in response to receiving an input at the respective interactive user interface element, the compliance checker to perform an action that corresponds to the respective interactive user interface element.

19. The non-transitory computer-readable medium of claim 18, wherein the one or more instructions, when executed by the one or more processors, further cause the device to perform an action prior to deployment of the source code in a production environment and in association with the indication of the compliance test result.

20. The non-transitory computer-readable medium of claim 18, wherein the user interface of the compliance checker comprises an interactive interface configured to receive non-code user inputs, and wherein the one or more user inputs are non-code user inputs.

* * * * *